(12) United States Patent
Vogel et al.

(10) Patent No.: US 10,399,545 B2
(45) Date of Patent: Sep. 3, 2019

(54) METHOD AND CONTROL UNIT FOR OPERATING A VEHICLE

(71) Applicant: ZF Friedrichshafen AG, Friedrichshafen (DE)

(72) Inventors: Volker Vogel, Friedrichshafen (DE); Arnold Schlegel, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 15/784,313

(22) Filed: Oct. 16, 2017

(65) Prior Publication Data

US 2018/0105150 A1 Apr. 19, 2018

(30) Foreign Application Priority Data

Oct. 17, 2016 (DE) .......... 10 2016 220 247

(51) Int. Cl.
| | | |
|---|---|---|
| *B60T 7/12* | (2006.01) |
| *B60T 8/32* | (2006.01) |
| *B60W 10/04* | (2006.01) |
| *B60W 10/18* | (2012.01) |
| *B60W 30/14* | (2006.01) |
| *B60T 7/22* | (2006.01) |

(52) U.S. Cl.
CPC .............. *B60T 7/12* (2013.01); *B60T 8/321* (2013.01); *B60W 10/04* (2013.01); *B60W 10/18* (2013.01); *B60W 30/143* (2013.01); *B60T 7/22* (2013.01); *B60T 2210/32* (2013.01); *B60T 2270/604* (2013.01)

(58) Field of Classification Search
CPC .......... B60T 7/12; B60T 8/321; B60W 10/00; B60W 10/04; B60W 30/14; B60W 40/02; B60W 40/08
See application file for complete search history.

(56) References Cited

U.S. PATENT DOCUMENTS 8,521,346 B2 8/2013 Haaf

FOREIGN PATENT DOCUMENTS

| DE | 3026652 A1 | 2/1982 |
| DE | 3815625 A1 | 11/1989 |
| DE | 69219272 T2 | 9/1997 |
| DE | 69126644 T2 | 12/1997 |
| DE | 102009018616 A1 | 10/2010 |
| JP | 20085585 A | 1/2008 |
| WO | 2011/002367 A1 | 1/2011 |
| WO | WO-2015057144 A1 * | 4/2015 ...... B60W 30/18109 |

OTHER PUBLICATIONS

German Search Report issued in corresponding German Patent Application No. 10 2016 220 247.2 dated Jul. 7, 2017.

* cited by examiner

*Primary Examiner* — Anne M Antonucci
*Assistant Examiner* — Renee LaRose
(74) *Attorney, Agent, or Firm* — Davis & Bujold PLLC; Michael J. Bujold

(57) ABSTRACT

A method of operating a vehicle (2) which recurrently travels along the same routes (1) with defined stopping points (3) along each of the routes (1). The parameters for operation of the vehicle (2) along the routes (1) are specified, on the basis of which the vehicle (2) can be braked, before the stopping points (3), and brought to rest at the stopping points (3).

9 Claims, 1 Drawing Sheet

METHOD AND CONTROL UNIT FOR OPERATING A VEHICLE

This application claims priority from German patent application serial no. 10 2016 220 247.2 filed Oct. 17, 2016.

FIELD OF THE INVENTION

The invention concerns a method for operating a vehicle recurrently traveling on the same routes with defined stopping points along the routes. In addition the invention concerns a control unit for carrying out the method.

BACKGROUND OF THE INVENTION

Numerous vehicles are known, which are operated recurrently on the same driving routes with defined and therefore repeatedly the same stopping points along the driving routes. Such vehicles include in particular buses for public transport, which repeatedly cover the same driving routes and always stop at the same points. Such vehicles also include in particular building machines, fork-lifts, trucks, taxis and trains.

Until now it has been left up to the skill of the driver to operate the vehicle in such manner that at the stopping points the vehicle is brought to rest in a defined manner. If a driver starts braking too soon, the journey time can be prolonged undesirably. On the other hand, if the driver brakes too late the vehicle has to be decelerated more sharply than desired, and this adversely affects comfort. A method is therefore needed for operating a vehicle, with the help of which method the vehicle can be brought to rest at stopping points in an optimum manner, and this indeed by making the best use of the vehicle's deceleration behavior at the stopping points concerned.

From WO 2011/002367 A1 a method for operating a vehicle is known, in which the vehicle is operated with active speed regulation in order to travel at a defined speed, wherein while driving uphill a first vehicle position is noted and during a subsequent downhill drive a speed is noted at a second position after the crest of the hill has been reached, and wherein depending on these a minimum speed at the crest is calculated, at which the vehicle should drive over the crest in order to reach the desired speed at the second position with minimum fuel consumption.

SUMMARY OF THE INVENTION

The purpose of the present invention is to provide a new type of method for operating a vehicle recurrently covering the same routes, with defined stopping points along the routes, and a control unit for operating a vehicle.

This objective is achieved by a method as described below.

According to the invention, along the routes, parameters for the operation of the vehicle are specified, on the basis of which the vehicle can be braked before the stopping points and can be brought to rest at the stopping points. On the basis of the parameters specified along the route, the vehicle can be brought to rest at the stopping points automatically in a defined manner, namely by defined braking of the vehicle before each stopping point, with a defined deceleration into the stopping point until the vehicle comes to rest.

According to an advantageous further development of the invention, as a parameter for the operation of the vehicle along the route concerned, a maximum speed profile with maximum speeds for positions along the route concerned is specified, and during the operation of the vehicle along the route, an actual speed of the vehicle is determined and compared with the maximum speed profile, and when the current actual speed of the vehicle is lower than the corresponding route-position-dependent maximum speed defined by the specified maximum speed profile, a desired drive torque specified by the driver is applied at the drive output unchanged, but when the current actual speed of the vehicle is higher than the corresponding route-position-dependent maximum speed of the specified maximum speed profile, the desired drive torque specified by the driver can automatically be changed, indeed in such manner that the actual speed can be adjusted to the specified maximum speed profile. By virtue of this further development, the vehicle can particularly advantageously be brought automatically to rest at the stopping points along the route.

Preferably, the parameters on the basis of which the vehicle can be braked and brought to rest are determined as a function of a maximum allowable deceleration for passenger comfort and/or as a function of topographical data and/or as a function of a braking torque that can be applied by a service brake and/or by a retarder. This enables particularly advantageous operation of the vehicle.

Preferably, at least when the current actual speed of the vehicle is higher than the corresponding route-position-dependent maximum speed defined by the maximum speed profile, a theoretical drive torque which is necessary for the actual speed to be adjusted to the maximum speed profile is calculated, and this theoretical drive torque is compared with the desired drive torque specified by the driver. If the desired drive torque specified by the driver is lower than the theoretical drive torque, the desired drive torque specified by the driver is applied unchanged at the drive output, but if the desired drive torque specified by the driver is higher than the theoretical drive torque, then the theoretical drive torque is applied at the drive output. This further development of the invention also enables optimum automatic deceleration of the vehicle along the route at stopping points until the vehicle is at rest.

Preferably, the theoretical drive torque is calculated as a function of a service brake torque that can be applied at the drive output and/or as a function of a retarder torque that can be applied at the drive output. When the vehicle has a retarder, the retarder is preferably actuated first in order to brake the vehicle. This takes better care of the service brakes.

According to an advantageous further development, the parameters for operating the vehicle along the route are determined from historical operating data relating to vehicles operated along the route concerned and supplied automatically to the vehicle that is to be operated along the route. By evaluating historical operating data from a number of vehicles operated along the route, the parameters for operating the vehicle can be obtained in a particularly advantageous manner.

Preferably, during the operation of the vehicle to be operated along the route, operating data along the route is registered and used for updating the parameters. On the basis of the current operation along the route, the parameters can then be updated.

The control unit according to the invention is also described below.

BRIEF DESCRIPTION OF THE DRAWINGS

Preferred further developments emerge from the description given below. Example embodiments of the invention, to which it is not limited, are explained in more detail with reference to the drawings, which show.

DETAILED DESCRIPTION OF THE PREFERRED EMBODIMENTS

The invention concerns a method and a control unit for operating a vehicle, namely a vehicle which recurrently travels on the same routes with defined stopping points along the routes.

Such a vehicle is preferably a public transport bus. In addition, such a vehicle can be for example a train, a suburban rail service, a building machine, a truck, a taxi, a fork-lift or the like.

Figure 1A:
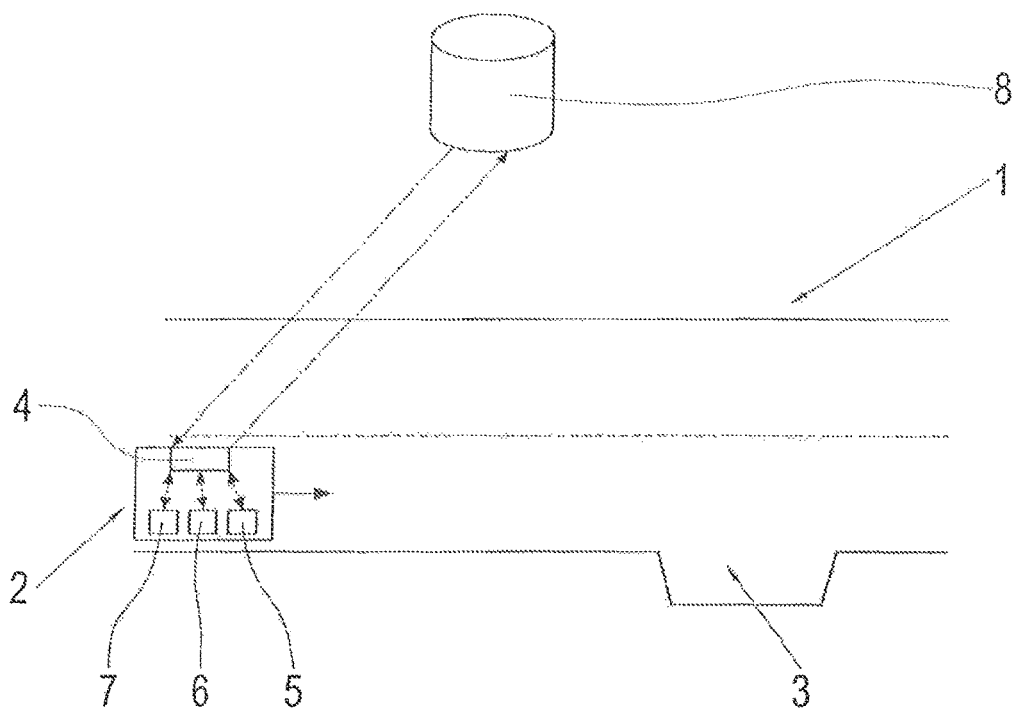
FIGS. 1, 1A: Very schematic diagram to make clear the invention.

FIG. 1A shows very schematically a route 1 for a vehicle 2 to be operated on this route, such that the vehicle 2 is brought to rest along the route 1 at defined stopping points 3. FIG. 1A shows such a stopping point.

FIG. 1A shows very schematically, as a component assembly of the vehicle 2, a control unit 4 that serves for the operation of the vehicle 2. Further components of the vehicle 2 are an accelerator pedal 5, service brakes 6 and a retarder 7, wherein the accelerator pedal 5, service brakes 6 and retarder 7 exchange data with the control unit 4 for controlling or regulating the operation thereof.

To be able to operate the vehicle 2 repeatedly on the route 1 in an optimum manner, namely by bringing it optimally to rest at the defined stopping points 3, it is proposed according to the invention that parameters are specified for the operation of the vehicle 2 along the route 1, such that on the basis of these parameters the vehicle 2 can be braked automatically before the stopping point 3 concerned and automatically brought to rest.

The parameters for operating the vehicle 2 along the route 1 are preferably stored in the control unit 4 and are supplied to the control unit 4 from a databank 8 which exchanges data with the control unit 4. The databank 8 can be a databank cloud.

The databank cloud contains parameters for the operation of the vehicle 2 along the route 1, which parameters are determined from historical operating data from vehicles operated along the route 1. These parameters are automatically communicated by the databank 8 to the control unit 4 of the vehicle 2 and thus supplied automatically, so that the corresponding parameters for the operation of the vehicle 2 along the route 1 are present in the control unit 4 for the route 1. Preferably, during the operation of the vehicle 2 to be operated along the route 1 on the basis of the parameters held ready in the control unit 4, during operation along the route 1, operating data is registered and then communicated to the databank 8 by the control unit 4 in order to update the corresponding parameters along the route 1.

The parameters held ready in the control unit 4 of the vehicle 2, on the basis of which the vehicle 2 can be braked in a defined manner before the stopping point 3 along the route 1 and then brought to rest at the stopping point 3 in a defined manner, are determined in particular as a function of a maximum allowed deceleration for passenger comfort, and/or as a function of route topography such as uphill and/or downhill slopes and/or curves, and/or as a function of the condition of the road, and/or as a function of a braking torque that can be applied by the service brakes 6 and/or the retarder 7.

Figure 1:
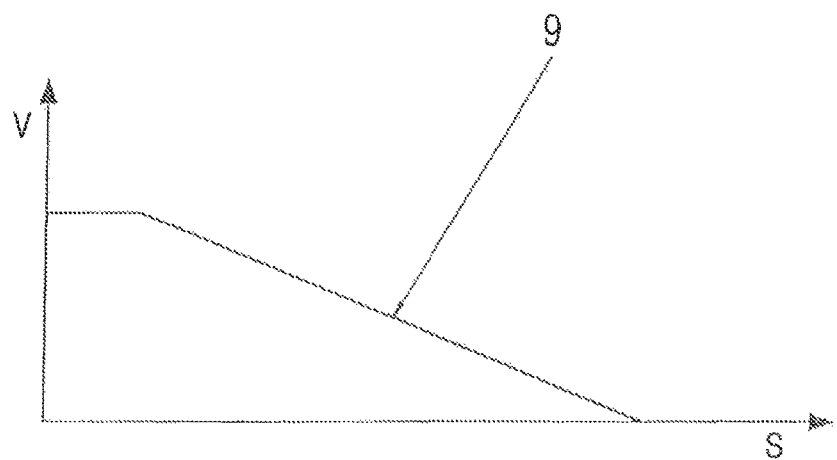

According to a particularly preferred embodiment of the invention it is provided that as a parameter for operating the vehicle 2 along the route 1, a maximum speed profile for the vehicle 2, which defines maximum speeds for positions along the route 1 concerned, is specified. Thus, over the route s, FIG. 1 shows a maximum speed profile 9 for the speed of the vehicle 2. This is preferably done in such manner that the vehicle 2 is braked with as constant as possible deceleration into the stopping point and brought to rest at the stopping point 3.

During the operation of the vehicle 2 along the route 1, a current actual speed of the vehicle 2 is determined and compared with the specified maximum speed profile 9, namely the corresponding route-position-dependent maximum speed defined by the maximum speed profile 9.

If the current, route-position-dependent actual speed of the vehicle 2 is lower than the corresponding route-position-dependent maximum speed defined by the maximum speed profile 9 at the route position concerned, then a desired drive torque specified by the driver using the accelerator pedal 5 is applied at the drive output of the vehicle 2 unchanged.

But if the current route-position-dependent actual speed of the vehicle 2 is higher than the corresponding route-position-dependent maximum speed defined by the maximum speed profile 9, then the desired drive torque specified by the driver using the accelerator pedal 5 can be changed by the control unit 4, and this indeed in such manner that the actual speed can be adjusted to the maximum speed profile 9.

For that purpose, if the actual speed of the vehicle 2 is higher than the corresponding route-position-dependent maximum speed defined by the maximum speed profile 9, the control unit 4 calculates a theoretical drive torque which is required for the actual speed to be adjusted to the maximum speed profile 9.

This theoretical drive torque is then compared with the desired drive torque specified by the driver using the accelerator pedal 5. If this desired drive torque specified by the driver is smaller than the theoretical drive torque, the desired drive torque specified by the driver is applied at the drive output of the vehicle 2 unchanged. On the other hand, if the desired drive torque specified by the driver is larger than the theoretical drive torque, then the control unit 4 applies the theoretical drive torque at the drive output as a control operation, so that the desired drive torque specified by the driver is limited by the theoretical drive torque.

In such a case the theoretical drive torque is calculated in particular as a function of a torque that can be applied by the service brake 6 at the drive output of the vehicle 2, and if the vehicle 2 has a retarder, then also as a function of a retarder torque that can be applied at the drive output of the vehicle 2 by the retarder 7. If the vehicle 2 cannot be decelerated in a defined manner and brought to rest by reducing a drive aggregate torque alone, then the vehicle is braked in a defined manner by automatically actuating the service brakes 6 and/or the retarder 7, namely until it comes to rest in the area of the stopping point 3, and in the case when the vehicle 2 has a retarder 7, the retarder 7 is actuated first in order to treat the service brakes 6 more gently. The torque that can be applied at the drive output of the vehicle 2 by the retarder 7 depends on the choice of a gear, so when the control unit 4 uses the retarder 7 to decelerate the vehicle, the unit 4 can specify an appropriate gear.

In the context of the present invention, during the operation of a vehicle 2 along a recurrent route 1 with defined stopping points 3, parameters must be specified for the operation of the vehicle, which are preferably implemented in a map of the route. On the basis of these parameters, the vehicle 2 can be braked automatically and brought to rest. In this way the vehicle 2 can be stopped in an optimal manner, and this indeed while respecting a maximum allowable deceleration, taking into account route topography data such as uphill and downhill slopes, curves and uneven ground, and also taking into account braking torques that can be applied at the drive output of the vehicle 2 by the service brakes 6 and the retarder 7 if one is present.

The parameters are held ready by a databank 8, in which they are also updated. The databank 8 then supplies the control unit 4 of the vehicle 2 with parameters appropriate for the operation of the vehicle 2.

Thanks to the invention, regardless of the skill of the driver, the vehicle 2 can be brought to rest at defined stopping points 3 in an optimum manner. This makes life easier for the driver of the vehicle 2.

INDEXES

1 Route
2 Vehicle
3 Stopping point
4 Control unit
5 Accelerator pedal
6 Service brake
7 Retarder
8 Databank
9 Maximum speed profile

The invention claimed is:

1. A method of operating a vehicle, where the vehicle recurrently travels on at least one route having defined stopping points along the at least one route, the vehicles having at least one vehicle operation regulating component connected to a control unit, the method comprising:
specifying parameters for operation of the vehicle along the at least one route on a basis of which the vehicle is braked before the vehicle arrives at the stopping points and is brought to rest at the stopping points;
specifying, as a parameter for the operation of the vehicle along a route concerned, a maximum speed profile with maximum speeds for route positions along the route concerned;
determining a current actual speed of the vehicle, during operation of the vehicle along the route concerned, and, with the control unit, comparing the current actual speed of the vehicle with the maximum speed profile;
controlling torque at a drive output of the vehicle with the control unit;
if the current actual speed of the vehicle is lower than a corresponding route-position-dependent maximum speed defined by the maximum speed profile, applying, via the control unit, a desired drive torque, specified by a driver, unchanged at the drive output of the vehicle;
if the current actual speed of the vehicle is higher than the corresponding route-position-dependent maximum speed defined by the maximum speed profile, changing, via the control unit, the desired drive torque specified by the driver such that the current actual speed is adjusted to the maximum speed profile;
if the current actual speed of the vehicle is higher than the corresponding route-position-dependent maximum speed defined by the maximum speed profile, calculating with the control unit a theoretical drive torque, which is necessary for the current actual speed to be adjusted to the maximum speed profile;
comparing, with the control unit, the theoretical drive torque with the desired drive torque specified by the driver;
if the desired drive torque specified by the driver is smaller than the theoretical drive torque, applying the desired drive torque specified by the driver at the drive output unchanged by the control unit;
if the desired drive torque specific by the driver is larger than the theoretical drive torque, controlling with the control unit the at least one vehicle operation regulating component to apply the theoretical drive torque at the drive output.

2. The method according to claim 1, further comprising defining the parameters with the control unit, on the basis of which the vehicle can be braked before the stopping points and brought to rest at the stopping points, as a function of at least one of:
a maximum allowable deceleration for passenger comfort,
topography data of the at least one route, and
a braking torque that is applicable by at least one of a service brake and a retarder.

3. The method according to claim 1, further comprising calculating, with the control unit, the theoretical drive torque as a function of a braking torque that can be applied at the drive output by service brakes.

4. The method according to claim 1, further comprising calculating, with the control unit, the theoretical drive torque as a function of a braking torque that can be applied at the drive output by a retarder.

5. The method according to claim 1, further comprising:
determining, in a databank, the parameters for the operation of the vehicle along the at least one route from historical operating data from other vehicles operated along the at least one route, and
with the databank, automatically supplying the parameters to the control unit of the vehicle (2) to be operated along the at least one route.

6. The method according to claim 5, further comprising, during the operation of the vehicle to be operated along the at least one route, registering and using operating data, in the control unit, along the at least one route for automatic updating of the parameters.

7. A vehicle control unit mounted in a vehicle, the vehicle being a vehicle that recurrently travels on a route having defined stopping points along the route, the control unit storing parameters for operation of the vehicle along the route on a basis of the stored parameters, a plurality of vehicle speed control components being connected to the control unit such that operation of the plurality of vehicle speed control components is controllable by the control unit, and the vehicle being braked before the stopping points and being brought to rest at the stopping points by the control unit via the plurality of vehicle speed control components.

8. The control unit according to claim 7, wherein the plurality of vehicle speed control components including at least one of an accelerator pedal, a retarder, and service brakes, and the control unit regulating operation of the vehicle speed control components for carrying out a method of operating the vehicle along the route having the stopping points along the route, the method comprising:
specifying the parameters for the operation of the vehicle along the route on a basis of which the vehicle is braked before arriving at the stopping points (3) and brought to rest at the stopping points by the control unit.

9. A method of operating a vehicle which repeatedly travels along a route which has defined stopping points, the vehicle having a plurality of vehicle speed control components which are controllable by a vehicle control unit to adjust vehicle speed, the method comprising:

determining, with the vehicle control unit, a current actual speed of the vehicle at a specified position located along the route in a travel direction before an approaching stopping point;

comparing, with the vehicle control unit, the current actual speed of the vehicle at the specified position with a maximum speed profile at the specified position;

slowing the vehicle with at least one of the plurality of vehicle speed control components, before the vehicle reaches the approaching stopping point, based on the comparison of the current actual speed of the vehicle and the maximum speed profile; and stopping the vehicle with the at least one of the plurality of vehicle speed control components at the approaching stopping point based on the comparison of the current actual speed of the vehicle and the maximum speed profile.

* * * * *